Oct. 29, 1968
C. F. MYERS
3,407,739
PUMPS AND PUMP HOUSING AND MOTOR UNIT
Filed Feb. 15, 1966
3 Sheets-Sheet 1
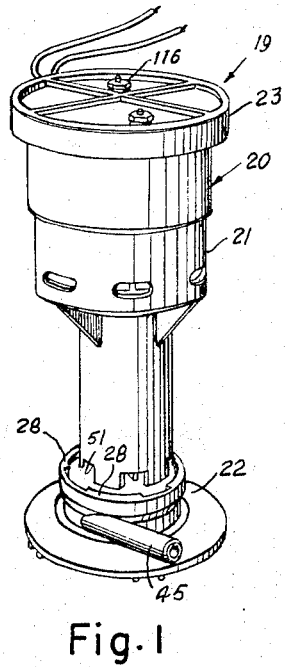
Fig. 1
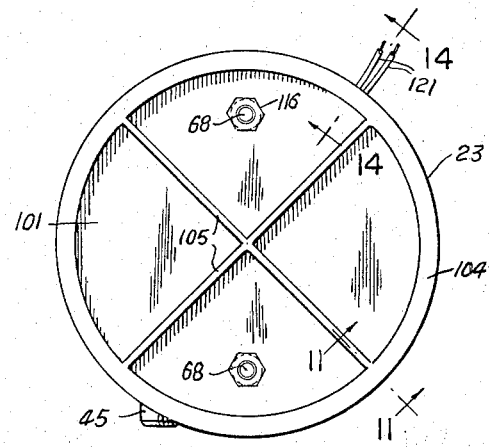
Fig. 2
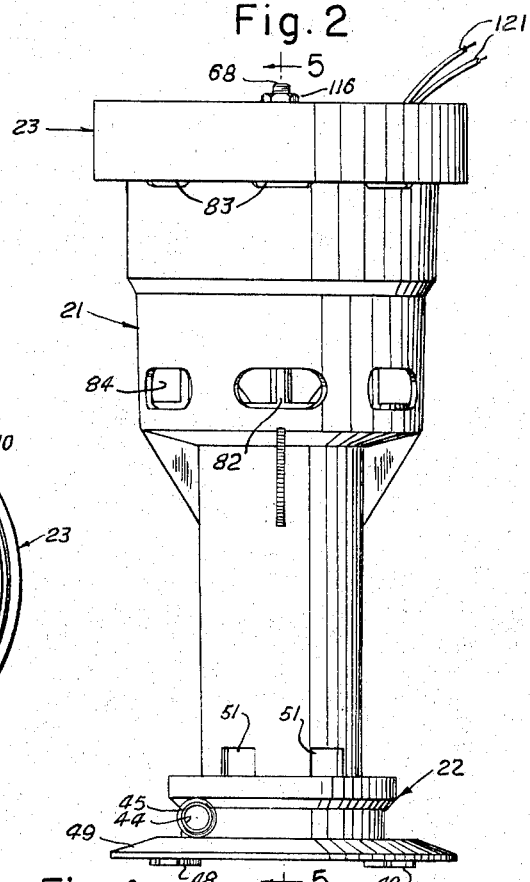
Fig. 3
Fig. 4
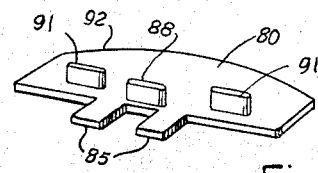
Fig. 17
INVENTOR
Charles F. Myers
BY *Hastings Ackley and Walter J. Jay*
ATTORNEYS Oct. 29, 1968

C. F. MYERS 3,407,739

PUMPS AND PUMP HOUSING AND MOTOR UNIT

Filed Feb. 15, 1966

INVENTOR
Charles F. Myers

BY

ATTORNEYS

Oct. 29, 1968   C. F. MYERS   3,407,739
PUMPS AND PUMP HOUSING AND MOTOR UNIT
Filed Feb. 15, 1966   3 Sheets-Sheet 3

INVENTOR
Charles F. Myers
BY   Hastings Ackley
  and
  Walter J. Jagn
ATTORNEYS

United States Patent Office 3,407,739
Patented Oct. 29, 1968

3,407,739
PUMPS AND PUMP HOUSING AND MOTOR UNIT
Charles F. Myers, Denison, Tex., assignor to Champion Cooler Corporation, Denison, Tex., a corporation of Texas
Filed Feb. 15, 1966, Ser. No. 527,430
12 Claims. (Cl. 103—87)

ABSTRACT OF THE DISCLOSURE

A pump having a housing assembly formed of a bottom impeller housing which is submersible in water, a tubular motor housing releasably connectable at its lower end to the impeller housing and a cover connected to the top end of the motor housing, the pump having an impeller in a chamber formed by the two housings driven by a motor secured in the motor housing.

---

This invention relates to pumps and more particularly motor driven pumps and to housing assemblies for such pumps.

An object of this invention is to provide a new and improved pump which is easily and quickly assembled.

Another object is to provide a housing assembly for a pump which has a minimum number of parts which are easily and quickly connectable to one another.

Still another object is to provide a housing assembly which includes an impeller housing, a vertical tubular motor housing whose lower end is releasably connectable to the impeller housing, and a cover securable to the motor housing for closing the top end of the motor housing.

A further object is to provide a three piece housing assembly for a pump wherein each of the three components of the housing assembly is a single integral piece formed of a durable shock resistant plastic.

A still further object is to provide a housing assembly which provides a chamber in which an impeller is rotatable and means above the chamber for mounting a motor for driving the impeller.

A still further object is to provide a pump which includes a housing assembly which provides an impeller chamber and has means for mounting a motor therein above the impeller chamber to drive the impeller.

Another object is to provide a pump having a motor disposed in a housing for driving an impeller and an air blower for moving air past the motor to cool the motor.

Still another object is to provide a pump having baffles in the housing for directing flow of air through the motor.

Still another object is to provide a pump having a housing assembly which includes a tubular motor housing in which a motor is mountable wherein the housing is provided with sets of ventilating ports above and below the motor and a blower for moving air into the housing through one of the sets of ports and outwardly through another and baffles in the housing for directing a flow of air past the motor to obtain optimum cooling of the motor.

Additional objects and advantages of the invention will be readily apparent from the reading of the following description of a device constructed in accordance with the invention, and reference to the accompanying drawings thereof, wherein:

FIGURE 1 is a perspective view of a pump embodying the invention;

FIGURE 2 is a top view of the pump;

FIGURE 3 is a bottom view of the pump;

FIGURE 4 is a side view of the pump;

FIGURE 17 is a top view of an air baffle of the pump.

Figure 5:
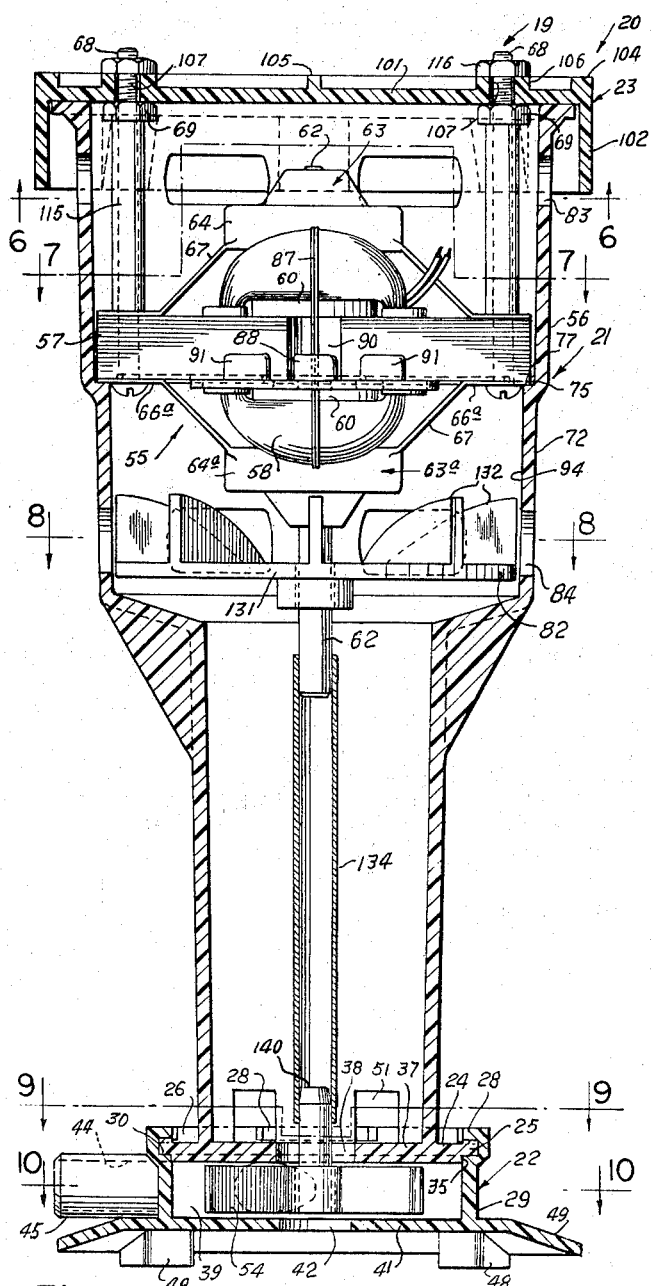
FIGURE 5 is a vertical sectional view taken on line 5—5 of FIGURE 4.
Figure 11:
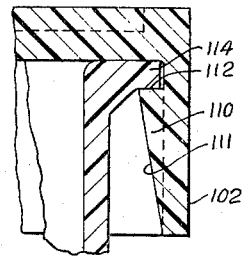
FIGURE 11 is an enlarged fragmentary sectional view taken on line 11—11 of FIGURE 2.
Figure 6:
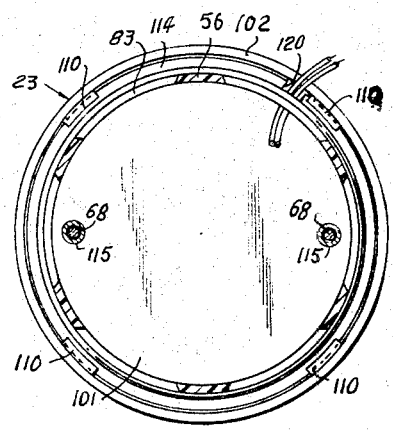
FIGURE 6 is a sectional view taken on line 6—6 of FIGURE 5.
Figure 7:
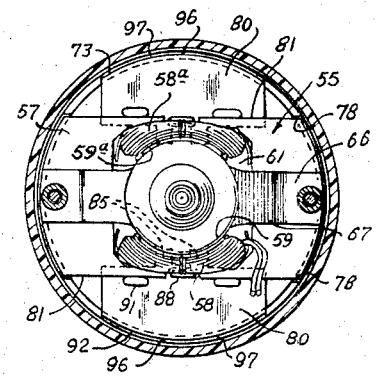
FIGURE 7 is a sectional view taken on line 7—7 of FIGURE 5.

Referring now to the drawings, the pump 19 embodying the invention includes a housing assembly 20 comprising a tubular housing 21, an impeller housing 22, and a cover 23. The motor and impeller housings and the cover are molded of a suitable, tough, shock resistant, somewhat resilient plastic. The motor housing has a bottom horizontal external annular wall 24 from which extend radially outwardly four circumferentially spaced arcuate support flanges 25. The support flanges are movable downwardly through the spaces 26 between the circumferentially spaced inwardly extending arcuate retainer flanges 28 of the annular vertical wall 29 of the impeller housing to rest on the annular upwardly facing shoulder 30 of the housing wall. When the support flanges rest on the wall shoulder, the housing is rotatable to position the support flanges below and in alignment with the retainer flanges. The support flanges are of somewhat smaller angular width, for example, 43 degrees, than the spaces 26 and the retainer flanges which may be 45 degrees in angular width.

The retainer flanges have radial downwardly opening recesses 32 in which are receivable the top radial bosses 33 of the support flanges. The retainer flanges 28 deform slightly upwardly as the bosses 33 engage the side surfaces 34 thereof during the movement of the support flanges into alignment with the retainer flanges to permit such movement of the support flanges until the bosses 33 move into alignment with the recesses 32 whereupon the retainer flanges move resiliently downwardly. Thereafter, the motor housing is releasably held against rotation relative to the impeller housing by the engagement of the bosses 33 in the recesses 32. The vertical annular external surface 35 of the external wall 24 engages the internal surface of the annular wall 29 of the impeller housing with sufficient tightness to provide a liquid tight seal therebetween.

The motor housing also has an internal annular horizontal wall 37 providing a central top inlet 38 to the impeller chamber 39 defined by the walls 37 and 24 of the motor housing, and the annular and bottom walls 29 and 41 of the impeller housing. The bottom wall has a central bottom inlet 42 for the impeller chamber and is in vertical alignment with the inlet 38. The passage 44 of the outlet duct 45 of the impeller housing opens, as at 46, to the impeller housing at the inner surface of the annular wall 29. Four substantially channel shaped circumferentially spaced feet 48 integral with the bottom walls support the impeller housing in a water trough, basin or the like. An external downwardly and outwardly inclined flange 49 extends outwardly of the bottom wall 41 of the impeller housing.

The motor housing has a plurality of ports or apertures 51 which extend upwardly from the internal wall so that when the pump is positioned in a trough, a basin or the like, water may flow into the impeller chamber both through the bottom inlet 42 and also through the top inlet 38.

An impeller 54 rotatably positioned in the impeller chamber is driven by an electric motor 55 located in the top portion 56 of the motor housing. The electric motor 55 may be of any suitable type, such as a single phase self starting induction motor of the shaded pole type having a stator 57 of iron laminations, a pair of field coils 58 and 58a mounted on the inwardly extending pole portions 59 and 59a of the stator, on which are also mounted the usual shading coils, not shown, and a squirrel cage rotor 60 positioned in the central opening 61 of the stator between the pole portions. The rotor shaft 62 is rotatably supported by top and bottom bearing assemblies 63 and 63a, respectively. The housings 64 and 64a of the bearing assemblies are rigidly secured to the stator by means of two screws 68 which extend through suitable aligned apertures in the flat end portions 66a of the support arms 67a of the bottom bearing housing, the stator, and the flat end portions 66 of the support arms 67 of the top bearing housing. The heads of the screws abut the flat end portions 66a while spacers nuts 69 threaded on the screws 68 engage the top ends of spacers 115 disposed about screws whose bottom ends engage the end portions 66. The screws, spacers nuts thus rigidly secure the bearing assemblies to the stator.

The motor housing has a middle portion 72 of reduced diameter whose top internal surface 73 has a pair of upwardly opening recesses 75 in which opposite end portions of the stator are positioned. The upwardly facing arcuate shoulders 77 defining the bottom ends of the recesses engage the bottom surface of the end portions 66a of the arms 67a to limit downward movement of the stator while the vertical shoulders 78 defining the sides of the recesses limit rotational movement of the stator in the housing.

A pair of baffles 80 substantially close the spaces between the flat sides 81 of the stator and the motor housing in order that most of the air moved by an impeller or blower 82 into the top of the motor housing above the motor through the apertures or ports 83 of the top housing portion 56 and out of the housing below the motor through the ports 84 of the middle housing portion 72, flow downwardly through the aperture 61 of the stator.

Each of the baffles has a pair of horizontal tongues 85 which are insertable between the bottom surface of the stator and the top surface of the bottom portion of a coil 58 and on opposite sides of the tie 87 which binds the top and bottom portions of the coils. The coils thus limit downward movement of the baffles. Each baffle also has an upwardly extending central tab 88 which is receivable in the vertical groove 90 of the stator through which the tie extends and a pair of side tabs 91 which are adapted to abut a vertical side 81 of the stator to limit inward movement of the baffle. The central tab limits the lateral movement of the baffle relative to the stator by its engagement with the surfaces thereof defining the groove 90. The arcuate outer edge portions of the baffles extend into a pair of upwardly opening recesses 96 of the motor housing and rest on the surfaces 97 defining the bottoms of the recesses.

The motor is held against upward movement in the motor housing by the screws 68 and the cover 23. The horizontal circular wall 101 of the cover has a dependent annular flange 102, a top peripheral flange 104, and top brace flanges 105. The horizontal wall also has upwardly extending bosses 106 through which open the screw apertures 107 of the cover.

The cover is releasably securable to the motor housing by a plurality of circumferentially spaced retainer bosses 110 whose inner surfaces 111 slope upwardly and inwardly and whose top surfaces 112 which are spaced below and parallel with the bottom surface of the core wall 101 are adapted to engage the bottom surface of the top external annular flange 114 of the motor housing. The cover being of a somewhat resilient substance, the dependent flange deforms outwardly at the location of the retainer bosses as it is telescoped downwardly over the top housing flange due to the camming engagement of the surfaces 111 of the retainer bosses with the outer edge of the housing flange until the top surfaces of the retainer bosses move below the bottom surface of the top housing flange, whereupon the dependent flange moves resiliently back to its original circular form. The housing flange is then tightly engaged by the bottom surface of the wall 101 of the cover and the top surfaces 112 of the retainer bosses.

The stator is secured to the cover by means of the screws 68 which extend through the apertures 107 of the cover, spacer sleeves 115 disposed about the screws whose bottom end surfaces engage the nuts and whose top end surfaces engage the wall 101 of the cover, and nuts 116 threaded on the screws which engage the top surfaces of the bosses 106 of the cover.

The motor housing flange has a slot 120 through which the electric conductors 121 of the electric motor extend outwardly from the housing to a suitable source of electric power.

The air blower 82 is rigidly secured to the shaft 62, as by a press fit, a set screw, or the like. The blower may be of the type having a horizontal disc 131 provided with radially extending vanes 132. The lower end of the motor drive shaft 62 is press fitted in the upper end of a tubular connector shaft 134. If desired, the upper end of the connector shaft may be crimped to ensure a rigid connection thereof with the drive shaft.

The water impeller 54 may also be of any suitable type and formed of a suitable plastic substance, such as nylon. The rotor impeller includes a plurality of vanes 136 which extend radially outwardly from a tubular hub 137. The impeller is preferably molded on the bushing 139 which may have an outer knurled surface to facilitate bonding of the hub to the bushing. A shaft 140 of steel or other suitable substance has its lower end press fitted in the bushing. The upper end of the shaft 140 is adapted to extend upwardly through the top inlet 38 and be press fitted into the lower end of the connector shaft. The impeller and shaft 140 may be, if desired, moulded as a single piece of plastic.

The pump is easily assembled by first mounting the air blower on the shaft 62 of the motor, then press fitting the upper end of the connector shaft, which may be of relatively soft substance, such as brass over the lower end of the drive shaft. The baffles are then mounted on the motor by inserting the tongues between the lower portion of the coil and the stator. The assembly of the motor, air blower, baffles and the connector shaft is then lowered into the motor housing until the opposite ends of the stator enter into the upwardly opening recesses 75 and the stator is supported on the shoulders 77. The cover 23 is telescoped over the top of the motor housing and is rigidly secured thereto by the engagement of the retainer bosses 110 with the motor housing flange 114. The cover is oriented to cause the screws to extend through the apertures 107 during the positioning of the cover on the housing. The nuts 115 are then threaded on the upper ends of the screws. The stator is now rigidly secured to the cover and the cover is rigidly secured to the motor housing. The motor is now held in the housing assembly against movement.

Figure 9:
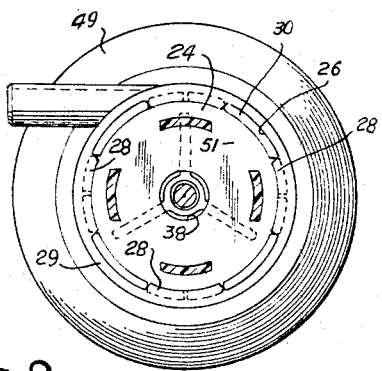
FIGURE 9 is a sectional view taken on line 9—9 of FIGURE 5.
Figure 8:
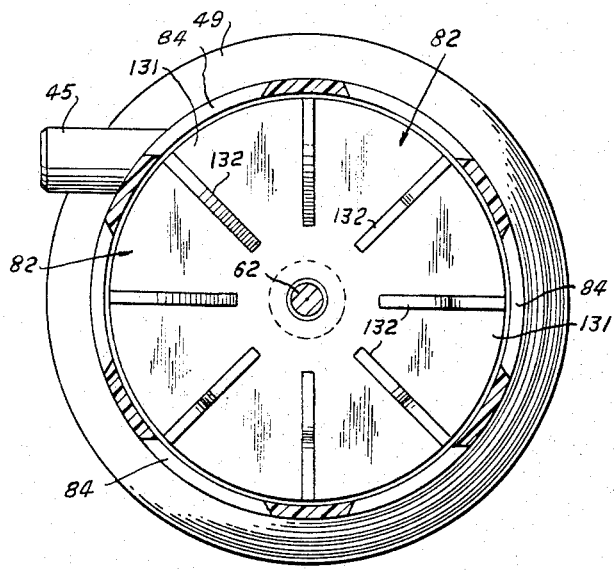
FIGURE 8 is a sectional view taken on line 8—8 of FIGURE 5.
Figure 12:
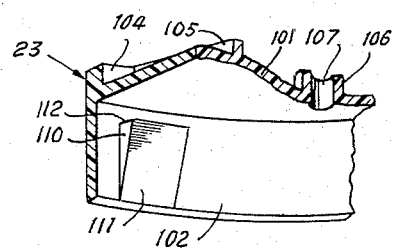
FIGURE 12 is a fragmentary perspective view of the cover of the housing assembly of the pump.
Figure 13:
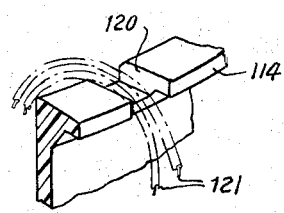
FIGURE 13 is an enlarged fragmentary perspective view of the top portion of the motor housing.
Figure 10:
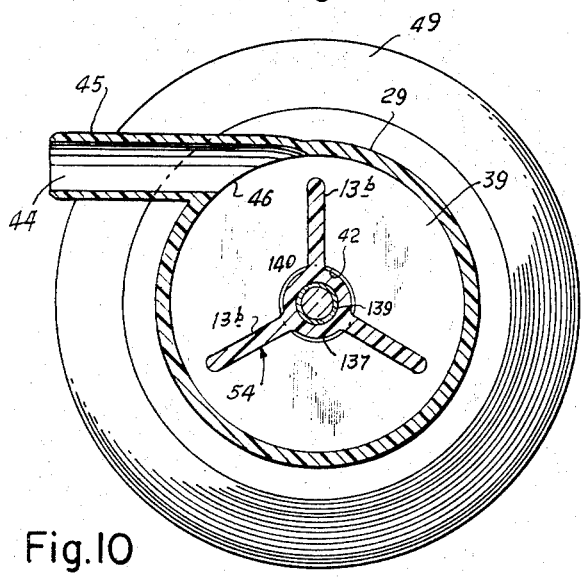
FIGURE 10 is a sectional view taken on line 10—10 of FIGURE 5.
Figure 14:
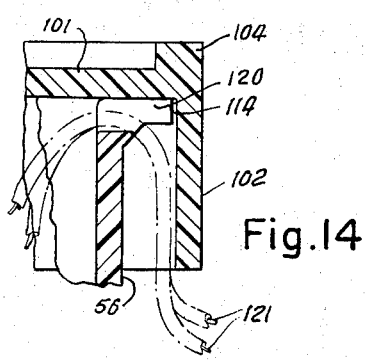
FIGURE 14 is an enlarged fragmentary sectional view taken on line 14—14 of FIGURE 2.
Figure 15:
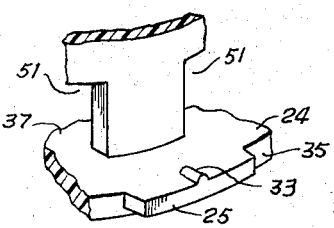
FIGURE 15 is a fragmentary enlarged perspective view of a support flange of the motor housing.
Figure 16:
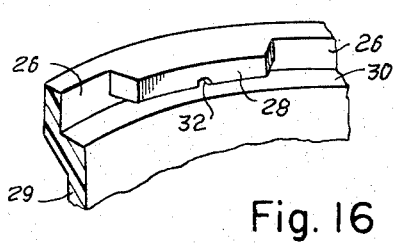
FIGURE 16 is an enlarged fragmentary perspective view of the impeller housing showing a retainer flange thereof.

The upper end of the shaft 140 of the impeller 54 is then inserted upwardly through the top inlet 38 of the internal wall 37 of the motor housing and is press fitted into the lower end of the connector shaft. If desired, a suitable tool may then be inserted through one of the apertures 58 of the motor housing to squeeze or crimp the bottom end of the shaft about the impeller shaft. The assembly of the motor, the motor housing and the impeller is then mounted on the impeller housing by lowering the impeller into the impeller chamber with the support flanges 25 of the motor housing moving through the spaces 26 between the retainer flanges 28 until the support flanges rest on the impeller housing shoulder 30. The motor housing is then rotated to position the bosses 33 of the support flanges moving them into alignment with the downwardly facing recesses of the retainer flanges whereupon the pump is assembled and ready for use. The water impeller is now positioned in the impeller chamber and spaced from all surfaces of the housing assembly. When the lower end of the housing assembly is placed in a trough, basin or the like filled with liquid, and supported on the impeller housing feet, energization of the motor causes the impeller to be rotated in a counter-clockwise direction, FIGURE 9, and liquid filling the trough is drawn into the impeller chamber through the top and bottom inlets 38 and 42 and then expeller outwardly by centrifugal force into the passage 44 of the outlet 45 and thence to a suitable conduit, not shown, connected to the outlet 45 which conducts the liquid to a desired location remote from the pump. The impeller housing feet hold the flange 49 of the impeller housing spaced from the bottom of the trough so the liquid may flow below the impeller housing to the bottom inlet. The liquid flows to the top inlet through the ports 51 of the motor housing. The air blower 82 causes air to be expelled outwardly through the bottom apertures or ports 84 of the motor housing and therefore to be drawn inwardly through the top ports 83. The baffles 80 causes a desired proportion of the air moved by the air blower to flow through the rotor aperture 61 of the stator to insure proper transfer of heat from the stator and rotor to the air and thus cool the motor.

The lower edge of the dependent cover flange extends over the upper portions of the top ports 83 of the motor housing and thus aids in preventing objects or drops of liquid from falling into the motor housing and onto the motor.

It will now be seen that a new and improved pump has been illustrated and described which includes a housing assembly having three one-piece molded plastic members, the cover 23, the motor housing 21, and the impeller housing 22, in which the motor, air blower and motor impeller are mounted.

It will further be seen that the pump is easily assembled, the assembly of the motor, air blower and connector shaft being installable as a unit in the motor housing.

It will further be seen that the motor housing, after the impeller has been rigidly secured to the tubular connector shaft, is easily and quickly mountable on the impeller housing 22.

It will further be seen that a new and improved housing assembly for pumps has been described and illustrated which includes three single piece components, an impeller housing, a motor housing and a cover and that these components are easily assembled to one another.

It will further be seen that the motor assembly is easily installed in the housing assembly simply by inserting it downwardly in the motor housing and then securing the cover on the motor housing.

The cover may be removed from the motor housing by unscrewing the nuts 116 and deforming the dependent flange 102 of the cover outwardly at the locations of the retainer bosses and pulling upwardly thereon.

The foregoing description of the inventoin is explanatory only, and changes in the details of the construction illustrated may be made by those skilled in the art, within the scope of the appended claims, without departing from the spirit of the invention.

What is claimed and desired to be secured by Letters Patent is:

1. The pump including: a housing assembly including a bottom single piece impeller housing, a tubular single piece motor housing connectable at its lower end to said impeller housing, and a single piece cover connectable to the top end of the motor housing, said impeller and motor housings having coengageable means integral therewith for releasably securing said housings to one another, said motor housing and said cover having coengageable means integral therewith for securing said cover to said motor housing, said housings providing a horizontally circular impeller chamber, said housing assembly having an inlet opening to said chamber at its central portion and an outlet opening to said chamber at its periphery; a motor mounted in said motor housing above said chamber having a vertical drive shaft; and an impeller in said chamber having a vertical shaft connected to said drive shaft.

2. The pump of claim 1, wherein said motor housing has means engageable with said motor for limiting downward and rotational movement of said motor in said motor housing, and means engageable with said cover for limiting upward movement of said motor relative to said cover whereby said motor is held against upward movement in said motor housing when said cover is secured to said motor housing.

3. The pump of claim 2, wherein said motor housing has upper and lower ports opening to the exterior thereof above and below said motor; and an air blower mounted on said drive shaft below said motor for moving air into said motor housing through one of said upper and lower ports, past said motor and out of said motor housing through the other of said upper and lower ports.

4. The pump of claim 1, wherein said motor housing has upper and lower ports opening to the exterior thereof above and below said motor; and an air blower mounted on said drive shaft below said motor for moving air into said motor housing through said upper ports, past said motor and out of said motor housing through said lower ports.

5. A pump including: a housing assembly including a single piece impeller housing, a tubular single piece motor housing connectable at its lower end to said impeller housing, and a single piece cover connectable to the top end of the motor housing, said impeller housing having an annular vertical wall providing an upwardly facing annular support shoulder and inwardly extending circumferentially spaced retainer flanges spaced above said support shoulder, and said motor housing having circumferentially spaced support flanges movable downwardly between said retainer flanges and movable rotationally into alignment with said retainer flanges and between said retainer flanges and said support shoulder for holding said motor housing against vertical movement relative to said impeller housing, said housings providing a horizontally circular impeller chamber, said housing assembly having an inlet opening to said chamber at its central portion and an outlet opening to said chamber at its periphery; a motor in said chamber having a vertical downwardly extending drive shaft; an impeller in said chamber, and means connecting said impeller to said drive shaft, said motor when energized rotating said impeller to cause it to move fluid inwardly into said chamber through said inlet opening and outwardly from said chamber through said outlet opening.

6. The pump of claim 5, wherein said retainer and support flanges have coengageable means for releasably securing said flanges against rotation relative to one another.

7. The pump of claim 6, wherein said housing has a top external flange and said cover has a horizontal wall and a peripheral flange extending downwardly from said wall provided with internal retainer bosses, said retainer bosses having inner upwardly and inwardly sloping cam surfaces and top horizontal surfaces spaced below said horizontal wall, said top flange of said motor housing being receivable between said top shoulders of said retainer bosses and said wall to secure said cover to said motor housing, wherein said motor housing has means engageable with said motor for limiting downward and rotational movement of said motor in said motor housing, means engageable with said cover and said motor for limiting upward movement of said motor in said housing, wherein said motor housing has upper and lower ports opening to the exterior thereof above and below said motor, and an air blower mounted on said drive shaft for moving air into said motor housing through one of said upper and lower ports, past said motor and out of said motor housing through the other of said upper and lower ports.

8. A pump including: a housing assembly including a bottom impeller housing, a tubular motor housing connectable at its lower end to said impeller housing, and a cover connectable to the top end of the motor housing, said impeller housing providing a horizontal circular impeller chamber, said housing assembly having an inlet opening to said chamber at its central portion and an outlet opening to said chamber at its periphery; a motor mounted in said motor housing above said chamber having a vertical drive shaft; an impeller in said chamber having a vertical shaft connected to said drive shaft, said impeller housing having an annular vertical wall providing an upwardly facing annular support shoulder and inwardly extending circumferentially spaced retainer flanges spaced above said support shoulder, said motor housing having circumferentially spaced support flanges movable downwardly between said retainer flanges and movable rotationally into alignment with said retainer flanges and between said retainer flanges and said support shoulder, said retainer and support flanges having coengageable means for releasably securing said flanges against rotation relative to one another; said housing having a top external flange and said cover having a horizontal wall and a peripheral flange extending downwardly from said wall provided with internal retainer bosses, said retainer bosses having inner upwardly and inwardly sloping cam surfaces and top horizontal surfaces spaced below said horizontal wall, said top flange of said motor housing being receivable between said top shoulders of said retainer bosses and said wall to secure said cover to said motor housing.

9. A housing assembly for a pump including: a single piece impeller housing; a tubular single piece motor housing, said housings having coengageable means for connecting the lower end of said motor housing to said impeller housing, said impeller housing comprising circumferentially spaced radially outwardly extending support flanges on the lower end of said motor housing, an upwardly facing shoulder of said impeller housing and circumferentially spaced retainer flanges of said impeller housing extending radially inwardly above and spaced from said shoulder; said housings providing a horizontally circular impeller chamber having top and bottom inlets, said impeller housing having an outlet opening to said chamber at a location remote from said inlets; said motor housing having internal means engageable with a motor insertable downwardly in said motor housing for limiting downward and rotational movement of the motor in said motor housing; and a cover for closing the top end of said motor housing, said cover and said motor housing having coengageable means for connecting said cover to said motor housing.

10. The housing assembly of claim 9, wherein said support and retainer flanges have releasable means for securing said flanges to one another upon rotation of said motor housing relative to said impeller housing to position said retainer flanges below and in alignment with said retainer flanges.

11. The housing assembly of claim 10, wherein said cover includes a horizontal circular wall and a peripheral flange dependent from said wall, and wherein said coengageable means for connecting said cover to said motor housing comprises a plurality of spaced internal retainer bosses on said peripheral flange and an external top annular flange of said motor housing, said top flange being receivable between the top surfaces of said retainer bosses and the horizontal wall of said cover.

12. The housing assembly of claim 11, wherein said retainer bosses have upwardly and inwardly inclined internal cam surfaces.

References Cited
UNITED STATES PATENTS

| | | | |
|---|---|---|---|
| 2,179,730 | 11/1939 | Ruthman | 103—104 |
| 2,542,896 | 2/1951 | Brady | 103—87 |
| 3,143,971 | 8/1964 | Green | 103—87 |
| 3,172,365 | 3/1965 | Nasvytis | 103—87 |

ROBERT M. WALKER, *Primary Examiner.*